United States Patent [19]

Kugler et al.

[11] Patent Number: 4,685,804

[45] Date of Patent: Aug. 11, 1987

[54] METHOD AND APPARATUS FOR THE MEASUREMENT OF THE LOCATION OR MOVEMENT OF A BODY

[75] Inventors: Hans-Peter Kugler, Zaisenhausen; Norbert Eisenreich, Pfinztal; Wolfgang Liehmann, Karlsruhe, all of Fed. Rep. of Germany

[73] Assignee: Fraunhofer-Gesellschaft zur Forderung der Angewadten Forschung e. V., Munich, Fed. Rep. of Germany

[21] Appl. No.: 720,481

[22] Filed: Apr. 9, 1985

Related U.S. Application Data

[63] Continuation-in-part of Ser. No. 361,123, Mar. 23, 1982, abandoned.

[30] Foreign Application Priority Data

Mar. 26, 1981 [DE] Fed. Rep. of Germany ....... 3112026

[51] Int. Cl.⁴ .............................................. G01B 11/00
[52] U.S. Cl. ................................................... 356/373
[58] Field of Search ....................... 356/372, 373, 375; 73/161, 653, 655; 352/373

[56] References Cited

U.S. PATENT DOCUMENTS

| | | | |
|---|---|---|---|
| 2,784,588 | 3/1957 | Humble et al. | 73/161 |
| 3,423,592 | 1/1969 | Selgin | 356/375 |
| 3,900,738 | 8/1975 | McKay | 356/375 |
| 3,945,730 | 3/1976 | Simecek et al. | 356/399 |
| 4,021,119 | 5/1977 | Stauffer | 356/375 |

FOREIGN PATENT DOCUMENTS

| | | |
|---|---|---|
| 2718807 | 9/1982 | Fed. Rep. of Germany . |
| 3112026 | 10/1982 | Fed. Rep. of Germany ...... 356/375 |
| 1590632 | 4/1970 | France . |
| 2314474 | 1/1977 | France . |

*Primary Examiner*—R. A. Rosenberger
*Attorney, Agent, or Firm*—Sandler & Greenblum

[57] ABSTRACT

A method is disclosed for measuring the rate and/or extent of movement of an oscillatory element positioned on an oscillating system by passing a reference beam towards a reference detector over a reference edge. The reference edge is fixed relative to the element. The measurement beam is directed towards the measurement detector over a measurement edge of a surface adapted to move together with the element relative to the reference edge. The movement of the measurement edge cuts the measurement beam as it moves into the path of the measurement beam. The rate and/or extent of movement of the element relative to the reference edge is determined by comparing the illumination received by each of the detectors. Apparatus is also disclosed for measuring the rate and/or extent of movement of an oscillatory element positioned on an oscillating system including a measurement edge adapted to move together with the element. A reference edge is maintained stationary relative to the measurement edge. A device is provided for generating measurement and reference beams directed towards each of the measurement and reference edges whereby at least the measurement beam is cut by the measurement edge upon movement of the measurement edge relative to the reference edge. Detectors are provided which are adapted to measure the amount of illumination cut by the measurement and reference edges and to generate a corresponding signal.

32 Claims, 3 Drawing Figures

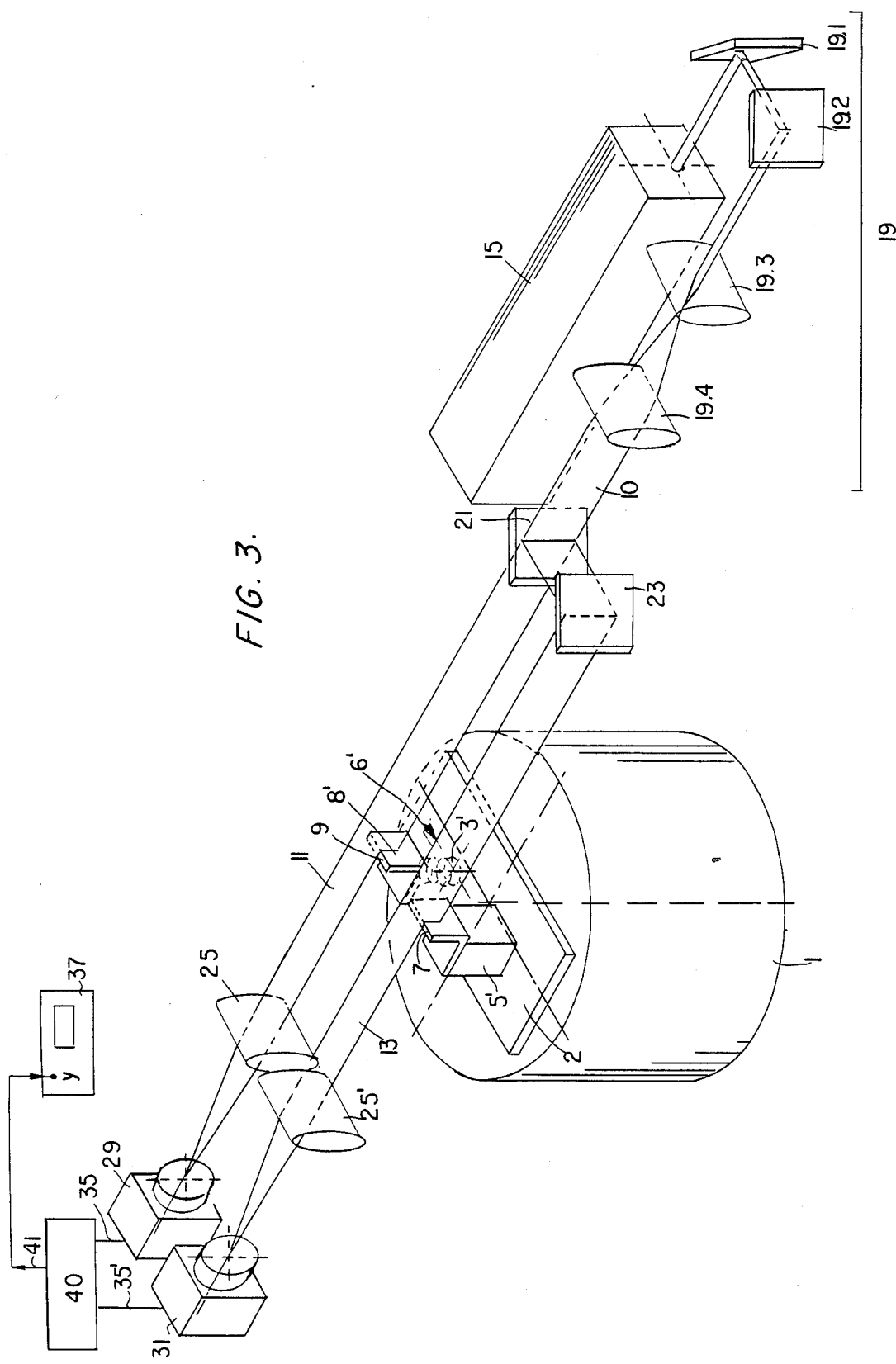

METHOD AND APPARATUS FOR THE MEASUREMENT OF THE LOCATION OR MOVEMENT OF A BODY

BACKGROUND OF THE INVENTION

1. Continuing Data

The application is a continuation-in-part of U.S. patent application Ser. No. 361,123, filed Mar. 23, 1982, now abandoned, which is hereby expressly incorporated by reference in its entirety.

2. Field of the Invention

The invention relates to a method for the measurement of the position or movement of an element, e.g., a vibrating or oscillating element, and particularly for the comparison of positions or movements, as well as to an apparatus for measuring the location or movement of an element, e.g., an oscillating or vibrating element, and particularly for the comparison of the location or movement of an element having its own vibratory characteristics which is positioned on an oscillatory system.

3. Description of Prior Art

Methods and apparatus or devices for the measurement of location or movement of an element are known. Such means and techniques include purely mechanical methods and apparatus, as well as methods and related apparatus for electrical measurement of size, such as voltage dividers and potentiometers, capacitance and inductive distance measurement apparatus, e.g., depth-finding apparatus, or electromagnetic impulse emitters.

Such methods and apparatus suffer from the disadvantage that they are not entirely free of feedback. Thus, the movement or location of the element being measured affects the measurement, and, therefore, the resulting measurement is often false or misleading. Also, such measurement equipment is sensitive to disturbing outside influences. Furthermore, such methods and apparatus are limited with regard to the measurement ranges possible, and require, in part, costly apparatus for interpreting the measurement results received.

SUMMARY OF THE INVENTION

It is an object of the present invention to provide a method and an apparatus for indicating location, movement, rate of movement, and vibrational characteristics of an element which has a simple display without being costly to manufacture, which may be simply operated which is free of exterior disturbing influences, and which provides high resolution and accuracy. The invention aims at providing an apparatus and technique which can be used to measure the vibrational characteristics, for example, of an element being tested.

The method of the instant invention is characterized in that a measurement beam and a reference beam having a finite width are directed from a laser beam source over a measurement edge of the moving element and over a reference edge, relative to which the element itself moves, whereby the beams are partially cut by the edges. Either the cut or uncut portions of the beams may be constantly measured by means of detectors, and compared with one another.

The apparatus of the invention achieves the above objectives in that a reference edge is provided near the element being measured, with the element moving relative to the reference edge. At least one laser is provided for generating a measurement and a reference beam. When using one laser beam source, the beam is split, and directed to a measurement edge of the element being measured, and passed over the reference edge. Detection means are provided for measuring the cut or uncut portions of the beam.

According to a preferred embodiment, the measurement and reference beams are formed by splitting a laser beam generated by a single laser. The laser beam is split into parallel measurement and reference beams by means of a semi-transparent mirror, which splits the beam, and a reflective mirror, which directs the reflected portion of the beam parallel to the beam portion which passes through the semi-transparent mirror.

In contrast with a known method and apparatus, the method and apparatus of the invention provide a completely contact-free measurement of the location and the movement of an element, and, in particular, provides a comparison of the movement of a reference body and the element being tested.

It is a particular objective of the invention that, through the use of a laser, the performance of the invention is completely independent of disturbing exterior light. Measurements may be taken without darkening, and in daylight without a filter.

The invention operates on the principle that the intensity distribution of a laser beam over its diameter is known. By partially obstructing a laser beam of, for example, 5 millimeters, the intensity of illumination which goes past the edge portion of the element being measured can be sensed, and varies as a function of the movement of the element. Alternatively, the edge associated with the moving element may be made reflective such that the portion of the illumination which is cut is reflected and varies as the element moves. Movement results in varying the extent of the reflective surface in the path of the illumination.

The geometry of the beams can always be adjusted as required by means of lenses, and by means of one or more obstructions or stops in the beam path.

According to the invention, there is a unknown movement of an edge positioned in the path of the measurement beam relative to the measurement apparatus which comprises at least one laser and detectors. The reference beam is passed over a reference edge which moves in known manner relative to the measurement apparatus. Significantly, the measurement beam is brought over the associated edge of a element, effecting unknown movements, while the measurement apparatus and the reference edge effect known movements relative to one another.

Photodetectors, such as photodiodes, secondary electron multipliers (photomultipliers), phototransistors, and the like can be used as photosensors, which serve as detectors. The normal measurement techniques are then followed, such that the illumination flux or energies of the portion of the beams which are not obstructed are measured.

As was described above, it is also possible to proceed whereby the edges are provided with reflective surfaces; the reflective surfaces being positioned along the beam path. In this embodiment, the illumination flux or energies of the reflected portions of the beams are measured by the detector. For comparison of both of the signals generated by both of the detectors, a comparison apparatus in the form of a cathode-beam oscilloscope is used, on which the phases and amplitudes are displayed. By feeding each of the outputs of the detectors into an X-Y inputs of a cathode-beam oscilloscope, a Lissajou pattern is projected.

Upon the oscillation or vibration of an element, depending upon the phase relationship, a line or an ellipse is shown on the oscilloscope screen whereby the line, respectively, a half axis of the ellipse inclines as a function of the illumination flux or energy of the measurement and reference beams.

Preferably, an adjustment or calibration apparatus is provided by which the results of the detectors for processing of the signals can be compared to one another such that, with identical measurement magnitudes, i.e., identical light intensities incident on both detectors, identical signal are measured. In this case, the line then lies on the oscilloscope screen at an angle of 45°.

For a simple measurement of the relative movement of the element, a subtraction of both signals can be performed. Such a subtraction can, according to a preferred embodiment, be performed by subtraction of both signals of the detectors by a difference amplifier. The output of the difference amplifier can be displayed along a time axis.

It is a further advantage of the invention that an extremely high resolution and sensitivity down to submicron levels can be achieved by using amplification techniques. The inventive technique and apparatus is likewise capable of measurements of up to several centimeters. The frequency range is limited only by the frequency limits of the detectors.

Using the inventive measurement technique having two beams, exterior effects are completely eliminated, and, particularly with a stationary reference object, it is possible to achieve high precision, where exterior disturbances pose no problem, in special cases, the reference beam may not even be necessary.

BRIEF DESCRIPTION OF THE DRAWINGS

Further advantages and observations relative to the invention will become clear from the description which follows:

FIG. 3 illustrates an embodiment of the inventive apparatus for performing the inventive method wherein the oscillatory element is a spring.

DESCRIPTION OF PREFERRED EMBODIMENTS

Figure 1:
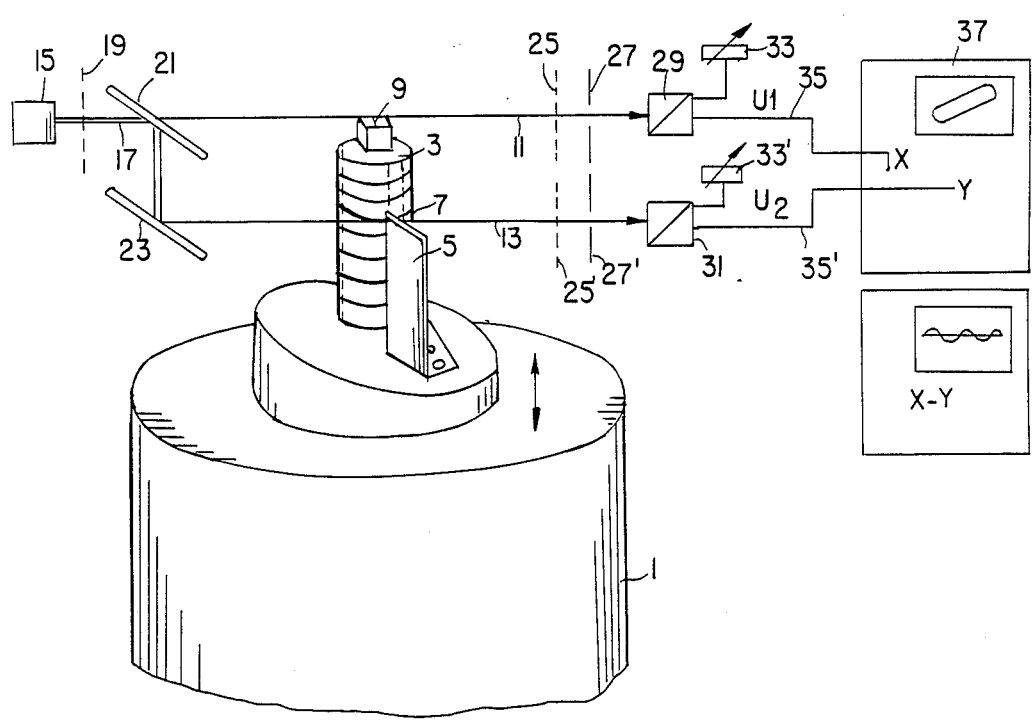
FIG. 1 illustrates one embodiment of the inventive apparatus for performing the inventive method which has an independently vibratory and/or oscillatory element positioned on an oscillating system.
Figure 4:
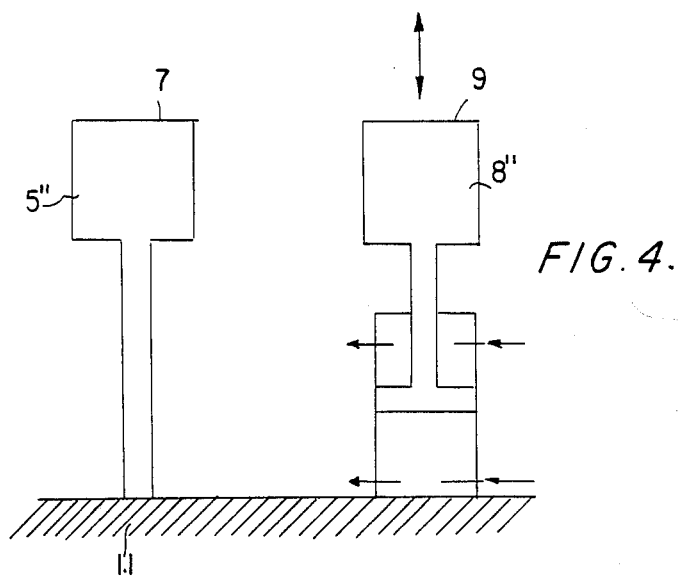

Referring to the drawing, an element 3 being vibrated or oscillated and a fixed member 5 with a reference edge, are each affixed, in parallel with one another, on a vibrating or oscillating system 1, such that measurement and reference beams 11 and 13, respectively, are directed, at any given moment, simultaneously over upper measurement edge 9 and reference edge 7, respectively.

To form measurement beam 11 and reference beam 13, a laser source 15 is provided whose beam 17 may be passed, if necessary, through image lens 19. Beam 17 is then directed to semi-transparent mirror 21. In the apparatus shown, by way of example, measurement beam 11 is formed by the portion of beam 17 which passes through semi-transparent mirror 21, while reference beam 13 is formed by reflection of a portion of beam 17 by semi-transparent mirror 21. The reflective beam portion is then reflected by a completely reflective mirror 23 to form reference beam 13, which is directed in parallel with measurement beam 11 over reference edge 7.

Both measurement beam 11 and reference beam 13 further pass through imaging lenses 25 and 25', and/or stops 27 and 27' onto measurement detector 29 and reference detector 31, respectively, wherein the intensity of measurement beam 11 and reference beam 13 at any point in time are measured, and converted into a signal having a phase and amplitude. Calibrating apparatus 33 and 33' are connected to detectors 29 and 31, respectively, for calibrating the detectors with one another in the stationary position such that they provide output signals with substantially equal values in a stationary position.

Outputs 35 and 35' of detectors 29 and 21 are each fed to a X-Y input of oscilloscope 37, where these values are are plotted whereby the imparted vibrations of the oscillatory element 3 relative to the movement of the oscillating system 1 and thereby, relative to the movement of member 5, can be measured. By taking the difference of the output signal of detectors 29 and 31, as is shown at the lower right of FIG. 1, the relative movement of the element 3 being vibrated is directly shown.

Figure 2:
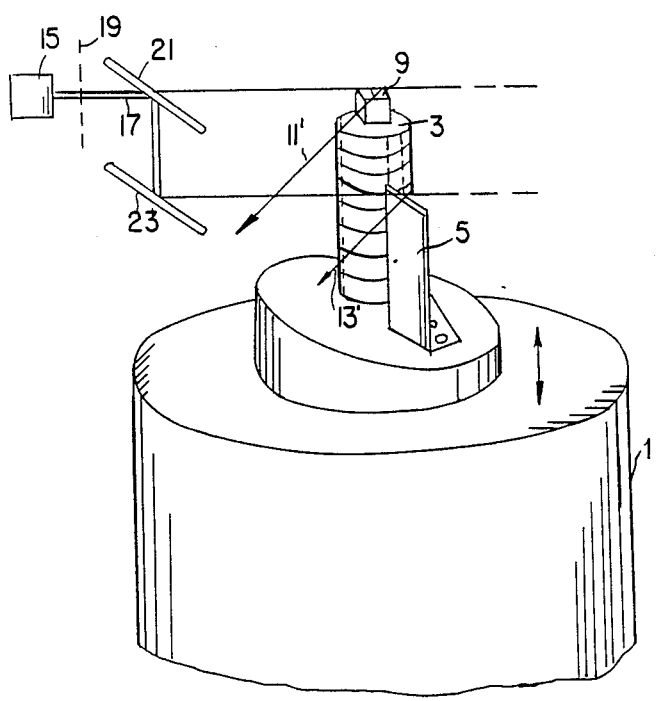
FIG. 2 is an embodiment of the apparatus in which cut light is reflected towards detectors (not shown)

FIG. 2 illustrates an alternative embodiment in which the portions of the beams which are cut are reflected off of reflective surfaces adjacent each of the edges which reflect beams 11' and 13' to detectors (not shown).

Detectors 29 and 31 can be in the form of photodiodes, secondary electron multipliers (photomultipliers), and phototransistors. For processing and reproducing the received output signals of the detectors, other apparatus other than cathode oscilloscope 37 can be provided. For example, mechanical plotters or the like can likewise be used. The dates of the tests can also be displayed.

FIG. 3 illustrates an embodiment of the device which carries out the process in accordance with the claimed invention. The drawing illustrates a light source, e.g., laser source 15. Surface mirrors 19.1 and 19.2 form part of an imaging lens 19. Cylindrical lenses 19.3 and 19.4 form a smooth light surface or light band 10, and first semi-transparent mirror 21 is positioned behind the lenses and permits traversal of a measurement beam 11 from light band 10. Another portion of light band 10 is reflected by semi-transparent mirror 21 and then reflected once more by reflective mirror 23, so that reference beam 13 will be directed in a substantially parallel fashion to measurement beam 11.

In the embodiment of FIG. 3, reference numeral 1 delineates an oscillatory generator or exciter (oscillating system 1) which sets a plate 2, which is attached to its upper surface, into some type of oscillatory motion, e.g., harmonic sinusoidal oscillation. Member 5' is connected securely to plate 2, and the reference edge 7 is positioned on the upper surface of member 5'. The body to be measured is in the form of a mechanical oscillatory body 6' attached to plate 2. The body to be tested can include, e.g., a spring 3' and mass 8' or a spring only.

A device formed in accordance with the present application enables the detection and measurement of relatively small movements. Upon relative movement of measurement edge 9 with respect to reference edge 7, an intensity differential, which corresponds to the differential of the instantaneous positions of edges 7 and 9, is obtained by detectors 29 and 31, which serves to track the relative motions of edges 7 and 9. The relative motion of the edges is dependent upon the properties of a given oscillatory body 6', i.e., the mass of mass 8', the force constant of spring 3', and the energy loss which occurs during damping. The oscillations of oscillatory body 6' causes relative motion between measurement edge 9 and reference edge 7, which is integral with that portion of the oscillating system 1 which is moved (plate 2 in FIG. 3). The invention relates to the relative motion of the oscillatory body 6' to be tested, which has a measuring edge, relative to a member 5 with reference edge, which is essentially stationary with respect to the plate 2 to which both the oscillatory body 6' and the reference edge 7 are attached.

The output signal as shown on oscilloscope 37 reflects the relative motion of the measurement edge compared to the reference edge. This relative motion is itself determined from the exciter frequency and the properties of oscillatory body 6', specifically the mass of the spring and possible energy loss. Outputs 35 and 35' may be fed into difference amplifier 40, as shown in FIG. 3, which outputs difference signal 41, which is then displayed on cathode-ray oscilloscope 37 along a time axis. Alternatively, outputs 35 and 35' may be fed directly into oscilloscope 37, as shown in FIG. 1.

In the embodiment described in FIG. 1 the oscillatory and/or vibratory characteristics of element 3, which can be, for example, a spring, are measured. The oscillating system 1 is set into motion, which in turn sets the element 3, and the measurement edge 9 thereon, into motion. This enables the relative motion of the element 3 and the member 5 to be measured. The particular oscillatory and/or vibratory charcteristics of the element 3 are in this way measured. Alternatively, a piston on which the element 3 and member 5 are attached, which corresponds to the plate 2 in FIG. 3, can be set into motion.

Using the apparatus and method of the invention, frequency tests could be made on oscillatory bodies, for example, on electric structural groups. These tests would allow measurement of the behavior of individual chips under the influence of movement, vibrations, oscillations, etc. Such tests can be important when electric structural groups are to be used in vehicles, spacecraft or the like. On the basis of these tests, measures can be taken to define the oscillation properties of such structural groups or elements. The limits of the elements can thus be determined so that, under the effect of the oscillation frequencies experienced during the intended use of the elements, which basically cannot be avoided or changed, there is no danger to the functionality of these elements. They are configured, for example, so that their own resonance frequencies lie far from the frequencies which produce oscillations. The U.S.A. Mi. Standard 810D, for example, is compiled with corresponding problems and tests.

One advantage of the optical process according to the invention in comparison with other known processes lies in the exact precision. A contactless measurement is carried out with exact precision, so that the measurement results are not affected by the additional mass of an oscillation receiver, for example, to which the oscillation frequencies are fed.

In an embodiment of the invention, both the reference edge and the oscillatory element are positioned on an oscillating system. The oscillating system comprises an oscillation generator or oscillation exciter. The oscillatory element is elastically bound to the upper surface of the oscillating system, for example, using a spring. The means for binding the element that is, the spring, and the oscillatory element, with the one measurement edge, together comprise an oscillatory body. The reference edge is rigidly fixed to the upper surface of the oscillating system. As the oscillating system is set in motion, the reference edge undertakes vibrations. The element and its measurement edge vibrates also as induced by the oscillating system, relative to the vibration of the reference edge. The amplitude of the vibrations of the element and the measurement edge depend on the vibration of the oscillatory element and the mass and elastic constant of the spring by which it is bound to the oscillating system.

In an embodiment of the invention, the reference edge can be moved in a predetermined or well-known manner, and the element to be tested with the measurement edge has either a movement completely independent from the movement of the reference edge or some other movement. Alternatively, the element to be tested has a movement with the measurement edge induced in some way by the movement of the reference edge. In the last case, the connection point of the measurement edge to the element to be tested may not be directly or indirectly with the reference edge, but must be movable relative to this edge, i.e., the reference edge must be on an oscillating structure, or system, and the element to be tested must be connected directly or indirectly with the reference edge through an oscillating structure, for example, a spring.

Although the invention has been described wtih reference to particular means and materials, it is understood that the invention extends to all equivalents falling within the scope of the claims.

We claim:

1. Method of measuring rate and extent of movement of an oscillatory element positioned on an oscillating system, said method comprising the steps of:
   (a) passing a reference beam towards a reference detector over a reference edge, said reference edge being positioned on and fixed relative to said oscilating system;
   (b) passing a measurement beam towards a measurement detector over a measurement edge, said measurement edge being positioned on a top surface of said oscillatory element such that said measurement edge generally moves together with said oscillatory element relative to said reference edge, whereby movement of said measurement edge cuts said measurement beam as it moves into the path of said measurement beam; and
   (c) determining the rate and extent of movement of said oscillatory element relative to said reference edge by comparing illumination received by each of said detectors.

2. The method as defined by claim 1 wherein each of said measurement and reference beams is a laser beam.

3. The method as defined by claim 2 further comprising generating each of said laser beams from a single laser beam source.

4. The method as defined by claim 3 comprising generating each of said beams from said single laser beam source by splitting a single laser beam into said measurement and reference beams.

5. The method as defined by claim 4 comprising splitting said laser beam into said reference and measurement beams by passing said laser beam from said laser beam source to a semi-reflective mirror, whereby a portion of said beam from said source passes through said mirror to form one of said reference or measurement beams, while the remaining portion of said beam from said beam source is reflected by said mirror to form the other of said reference or measurement beams, each of said beams being substantially parallel to one another.

6. The method as defined by claim 5 wherein each of said measurement and reference detectors is positioned to receive illumination which is not deflected by either of said measurement and reference edges.

7. The method as defined by claim 6 wherein said determining step comprises the step of displaying output signals generated by said detectors on cathode-ray oscilloscope.

8. The method as defined by claim 6 wherein said determining step comprises the steps of
    (a) inputting said signals into a difference amplifier to obtain a difference signal; and
    (b) displaying said difference signal on a cathode-ray oscilloscope.

9. The method as defined by claim 5 wherein each of said measurement and reference edges comprises a reflective surface whereby the portions of said beams which are cut by each of said edges are reflected by said reflective surfaces to each of the corresponding measurement and reference detectors.

10. The method as defined by claim 9 wherein said determining step comprises the step of displaying output signals generated by said detectors on a cathode-ray oscilloscope.

11. The method as defined by claim 9 wherein said determining step comprises the steps of
    (a) inputting said signals into a difference amplifier to obtain a difference signal; and
    (b) displaying said difference signal on a cathode-ray oscilloscope.

12. A method of measuring vibrational characteristics of an oscillatory element comprising the steps of:
    (a) mounting said element on an oscillating system, said oscillating system having a reference edge thereon which moves substantially in unison with said oscillating system;
    (b) directing a reference beam of illumination over said reference edge to a reference detector to provide a reference signal, whereby vibratory movements of said oscillating system result in said reference edge cutting said reference beam and changing the amount of illumination reaching said reference detector;
    (c) directing a measurement beam adjacent to said reference beam and over a measurement edge toward a measurement detector to form a measurement signal, said measurement edge being positioned on a top surface of said oscillatory element, whereby vibratory movements of said oscillatory element result in said measurement edge cutting said measurement beam and changing the amount of illumination reaching said measurement detector; and
    (d) passing the signals generated by each of said measurement and reference detectors to a difference amplifier to determine the vibrational characteristics of said oscillatory element.

13. The method as defined by claim 12 further comprising displaying the vibrational characteristics of said oscillatory element on a cathode-ray oscilloscope.

14. The method as defined by claim 12 wherein the cutting of said reference and measurement edges reduces the illumination reaching each of said reference and measurement detectors.

15. The method as defined by claim 14 wherein said measurement and reference beams follow a path across each of said measurement and reference edges to each of said measurement and reference detectors.

16. The method as defined by claim 15 wherein said measurement and reference beams are laser beams passing in parallel over said measurement and reference edges.

17. The method as defined by claim 16 further comprising generating each of said parallel measurement and reference laser beams by splitting a laser beam generated by a laser beam source.

18. The method as defined by claim 17 comprising splitting said laser beam generated by said laser beam source by directing said laser beam to a semi-reflective mirror whereby a portion of said laser beam passes through said mirror while the remaining portion of said laser beam is reflected to a reflective mirror to form said parallel reference and measurement beams.

19. The method as defined by claim 12 wherein each of said reference and measurement edges comprises a reflective surface adjacent thereto for reflecting each of said reference and measurement beams onto each of said reference and measurement detectors.

20. An apparatus for measuring the rate and extent of an oscillatory element positioned on an oscillating system, said apparatus comprising:
    (a) a measurement edge positioned on a top surface of said oscillatory element such that said measurement edge moves together with said oscillating system;
    (b) a reference edge, said reference edge being stationary relative to said oscillating system;
    (c) means for generating measurement and reference beams directed towards each of said measurement and reference edges whereby at least said measurement beam is cut by said measurement edge upon movement of said measurement edge relative to said reference edge; and
    (d) a plurality of detectors for measuring an amount of illumination cut by said measurement and reference edges and for generating a corresponding signal.

21. The apparatus as defined by claim 20 comprising a single laser beam source for generating said measurement and reference beams.

22. The apparatus as defined by claim 20 further comprising means for splitting a laser beam emitted by said laser beam source into said measurement and reference beams.

23. The apparatus as defined by claim 22 wherein said means for splitting said laser beam into said measurement and reference beams comprises a semi-reflective mirror for splitting said laser beam into a reflected beam and a beam passing through said mirror, thereby forming each of said measurement and reference beams.

24. The apparatus as defined by claim 23 further comprising a reflective mirror for reflecting said reflected beam substantially parallel to the beam passing through said semi-transparent mirror.

25. Apparatus according to claim 20 wherein said plurality of detectors are connected to a means for comparing the signals of each of said detectors.

26. Apparatus as defined by claim 25 wherein the comparing means comprises a difference amplifier for subtracting the signals of each of said detectors to provide a resultant signal.

27. Apparatus as defined by claim 25 wherein the comparing means comprises a cathode-ray oscilloscope for displaying said signals of each of the detectors.

28. Apparatus as defined by claim 25 wherein said comparing means comprises a difference amplifier for subtracting the signals of each of said detectors to provide a resultant signal and a cathode-ray oscilloscope for displaying said resultant signal.

29. Apparatus as defined by claim 20 wherein each of said detectors receives any illumination which is not cut by said measurement and reference edges.

30. Apparatus as defined by claim 29 further comprising reflective surfaces adjacent to said reference and measurement edges for reflecting the cut portions of each of said reference and measurement beams to each of said detectors.

31. Apparatus as defined by claim 20 further comprising means for moving said oscillatory element and means for calibrating said detectors such that said detectors provide output signals with substantially equal values in a stationary position.

32. A method of measuring the unknown rate and extent of movement of an independently oscillatory or vibratory element positioned on an oscillating system, said method comprising the steps of:
 (a) vibrating said oscillating system thereby oscillating said element in a predetermined direction, whereby the vibration of said oscillating systems also causes a reference edge to oscillate, said reference edge being positioned on a fixed member mounted on said oscillating system;
 (b) measuring the rate and extent of movement of said element by passing beams of a stationary laser over a measurement edge attached to said element and over said reference edge, said measurement edge oscillating relative to the laser by known movements; and
 (c) determining the fraction of beams not cut by said edges.

* * * * *